Patented Mar. 18, 1952

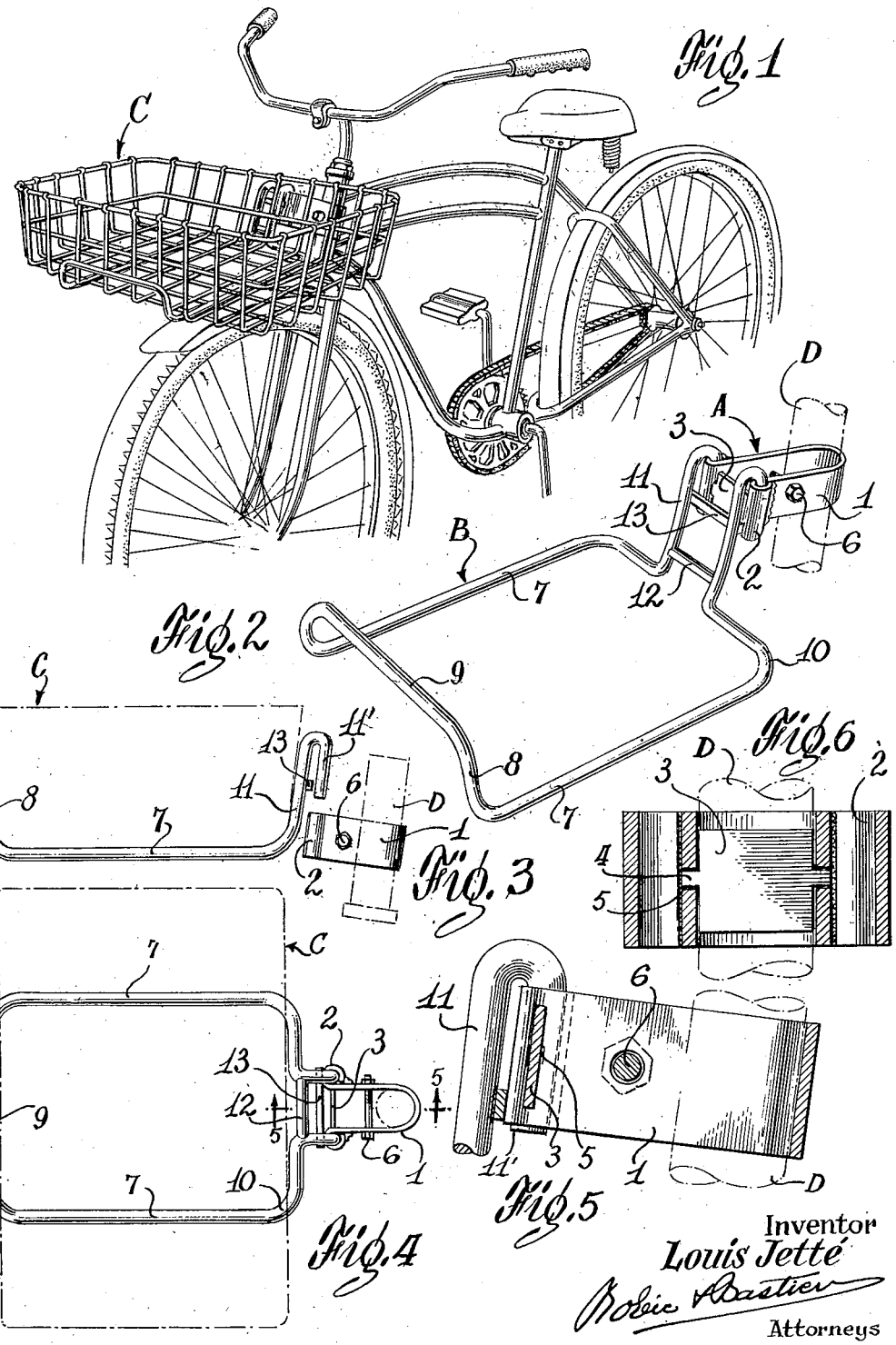

2,589,497

UNITED STATES PATENT OFFICE 2,589,497

LUGGAGE CARRIER FOR BICYCLES

Louis Jette, Shawinigan Falls, Quebec, Canada

Application March 1, 1950, Serial No. 146,963
In Canada October 19, 1949

5 Claims. (Cl. 224—35)

1

The present invention relates to a luggage carrier, and more particularly to a luggage carrier adapted to be affixed to the front sleeve of a bicycle frame.

An important object according to this invention is the provision of a luggage carrier of the character described which is readily affixable and removable at a suitable anchor member fastened to the front sleeve of a bicycle frame.

Another important object according to this invention is the provision of a luggage carrier which is affixable to a bicycle frame in alignment therewith, thereby ensuring constant weight distribution on the bicycle wheels.

Still a further object according to this invention is the provision of a luggage carrier which is readily removable from a bicycle frame, but which is at the same time securely held by the same to prevent its jumping out of the anchor member when the bicycle rides on a bumpy road.

Another important object according to this invention is a luggage carrier of the character described which is simple and inexpensive to manufacture and which at the same time is remarkably strong and resistant to shock.

The foregoing and other important objects according to this invention will become apparent during the following disclosure and by referring to the drawing in which:

Figure 1 is a perspective view of a bicycle to which is affixed the luggage carrier according to this invention;

Figure 2 is a perspective view of the luggage carrier itself with the basket removed;

Figure 3 is a side elevation of the same, showing how the support member is removed from the anchor member;

Figure 4 is a plan view of the same;

Figure 5 is a longitudinal section of the anchor member according to this invention and, Figure 6 is a cross sectional elevation of the same along its tube elements.

Referring now more particularly to the drawing in which like reference characters indicate like elements throughout, the luggage carrier according to this invention comprises essentially an anchor member indicated at A, and a support member indicated at B, which support member may carry a basket C or the like, or otherwise carry directly the articles to be transported.

The anchor member A consists essentially in a metal band 1 bent into a U, to enclose the front sleeve D of the bicycle frame, said band 1 having its free end outwardly bent and welded to form tubes 2 having their axis parallel with the sleeve D.

2

These tubes 2 are maintained in a suitable, constant spaced relation by means of a spacer plate 3 disposed inwardly of the two legs of the band 1, and having end lugs 4 adapted to engage suitable apertures 5 made in the legs of the band 1 near the tubes 2.

A bolt and nut assembly 6 is disposed between said spacer plate 3 and sleeve D and engage the legs of the band 1 to tighten the anchor member in place on said sleeve D. The support member B is made of a single length of heavy wire or metal rod, and the main length thereof is shaped to provide two parallel horizontally disposed arms 7 upwardly bent at their outer ends 8 and joined by a bridge 9 to provide a guard for the basket C or other articles to be carried.

The inner ends of arms 7 are inwardly bent at right angles at 10 to provide a suitable spacing for the upstanding dependent arms 11, the free end 11' of which is bent back in a downward direction to engage the tubes 2 of the anchor member A.

A spacer rod 12 is disposed between said upstanding arms 11, being welded thereto, together with a bearing bar 13 which is also welded to the upstanding arms 11, but on the side facing the tubes 2.

Thus the spacer rod 12 reinforces the support member B and helps to maintain the intended rigid shape of the latter, while the bearing bar 13 helps to maintain the support member B in suitable horizontal position relative to the frame of the bicycle.

If a basket such as the wire-mesh basket C is to be carried by the support member B, it may be fastened thereto by any means, and may be even permanently secured thereto by welding or otherwise.

It should be noted that the weight of the article carried by the support member 8 maintains the latter in frictional engagement with the tubes 2 of the anchor member A, thereby preventing accidental disengagement of said support member B.

The support member B and associated basket C may be readily removed from the anchor member A when not in use.

Furthermore, when a fleet of bicycles are provided with the anchor member A, the support member B and associated basket C may be indifferently affixed to any one of the bicycles.

While a preferred embodiment according to this invention has been illustrated and described, it is understood that various modifications may be resorted to without departing from the spirit and scope of the appended claims.

Having now described my invention, what I claim is:

1. In a luggage carrier for bicycles, an anchor member having two upstanding tube elements and a luggage support member comprising a horizontally extending main part having two spaced parallel upstanding arms, said arms having two downwardly projecting elements to engage said tube elements, and a transverse bar mounted on said arms to contact said tube elements.

2. In a luggage carrier for a bicycle, an anchor member comprising a U band to enclose the front sleeve of the frame of said bicycle, tightening means for said band and dependent upstanding tube elements at the free ends of said U band; and a luggage support member comprising a horizontally extending main part having two spaced parallel upstanding arms, said arms having two downwardly projecting elements to engage said tube elements, and a transverse bar mounted on said arms to contact said tube elements.

3. In a luggage carrier for a bicycle, an anchor member comprising a U band to enclose the front sleeve of the frame of said bicycle, tightening means for said band and dependent upstanding tube elements at the free ends of said U band and a spacer plate between said free ends; and a luggage support member comprising a single frame member bent to form two spaced parallel upstanding arms, said arms having two downwardly projecting elements to engage said tube elements and a transverse bar mounted on said arms to contact said tube elements.

4. In a luggage carrier for bicycles, an anchor member having two upstanding tube elements and a luggage support member comprising a single metal rod bent to form a rectangle having two spaced parallel upstanding arms, said arms having two downwardly projecting elements to engage said tube elements, and a transverse bar mounted on said arms to contact said tube elements.

5. In a luggage carrier for a bicycle, an anchor member comprising a U band to enclose the front sleeve of the frame of said bicycle, tightening means for said band and dependent upstanding tube elements at the free ends of said U band and a spacer plate between said free ends; and a luggage support member comprising a single metal rod bent to form a rectangle having two spaced parallel upstanding arms, said arms having two downwardly projecting elements to engage said tube elements, and a transverse bar mounted on said arms to contact said tube elements.

LOUIS JETTE.

REFERENCES CITED

The following references are of record in the file of this patent:

UNITED STATES PATENTS

| Number | Name | Date |
|---|---|---|
| 436,403 | Dabbs | Sept. 16, 1890 |
| 586,295 | Terry | July 13, 1897 |
| 2,531,902 | Baron | Nov. 28, 1950 |